United States Patent [19]

Brothers et al.

[11] Patent Number: 5,348,584
[45] Date of Patent: Sep. 20, 1994

[54] HYDROCARBON LIQUID AND WATER DISPERSIBLE PARTICULATE CEMENT COMPOSITIONS

[75] Inventors: Lance E. Brothers, Ninnekah; Jeffrey A. Dahl, Duncan, both of Okla.

[73] Assignee: Halliburton Company, Duncan, Okla.

[21] Appl. No.: 156,149

[22] Filed: Nov. 23, 1993

Related U.S. Application Data

[63] Continuation-in-part of Ser. No. 85,530, Jun. 30, 1993, abandoned.

[51] Int. Cl.⁵ ................................................ C04B 24/20
[52] U.S. Cl. .................................... 106/725; 106/790; 106/809; 106/816; 166/292; 166/293; 405/266; 405/267; 507/103
[58] Field of Search ............... 106/725, 809, 816, 790; 405/266, 267; 166/292, 293; 428/403; 507/103

[56] References Cited

U.S. PATENT DOCUMENTS

| | | | |
|---|---|---|---|
| 2,172,076 | 9/1939 | Wolf et al. | 106/18 |
| 3,232,777 | 2/1966 | Bush | 106/708 |
| 3,769,051 | 10/1973 | Hardin | 106/665 |
| 4,187,118 | 2/1980 | Nakagawa et al. | 106/708 |
| 4,223,733 | 9/1980 | Bodor et al. | 166/293 |
| 4,224,076 | 9/1980 | Moitra et al. | 106/725 |
| 4,247,334 | 1/1981 | Falcoz et al. | 106/725 |
| 4,931,192 | 6/1990 | Covington et al. | 210/751 |
| 4,992,104 | 2/1991 | Boutevin | 106/724 |
| 5,016,711 | 5/1991 | Cowan | 166/250 |
| 5,121,795 | 6/1992 | Ewert et al. | 166/292 |
| 5,125,976 | 6/1992 | Skvára et al. | 106/724 |

*Primary Examiner*—Anthony Green
*Attorney, Agent, or Firm*—Robert A. Kent; Thomas R. Weaver; C. Clark Dougherty, Jr.

[57] ABSTRACT

This invention relates to a dry, fine particle size hydraulic cement composition, which is directly dispersable in both water and a hydrocarbon liquid and to the use of said composition in oil well cementing operations and methods of terminating water flow in subterranean hydrocarbon producing formations.

16 Claims, No Drawings

HYDROCARBON LIQUID AND WATER DISPERSIBLE PARTICULATE CEMENT COMPOSITIONS

CROSS-REFERENCE TO RELATED APPLICATION

This is a continuation-in-part of application Ser. No. 08/085,530 filed Jun. 30, 1993, now abandoned.

BACKGROUND OF THE INVENTION

1. Field of the Invention

This invention relates to a dry, fine particle size particulate hydraulic cement composition, a method of forming a hydrocarbon liquid slurry using said composition, a method of forming a water slurry using said composition, and methods of utilizing said slurries.

2. Description of the Prior Art

Dahl, et al., in U.S. Pat. No. 5,238,064 disclose a method of using a fine particle size cement in a hydrocarbon slurry to prevent the flow of unwanted water from a subsurface formation into a wellbore. The relevant portion of Dahl, et al., is set out below.

Subterranean formations sometimes produce unwanted water from natural fractures as well as from fractures produced by forces applied deliberately or accidentally during production operations. It is known that such fractures provide a path of least resistance to the flow of fluid from a formation to a wellbore. When the fluid flowing in a fracture is primarily oil, the fracture is considered to be beneficial and thus desirable; however, when the fluid flowing in the fracture from the formation to the wellbore is primarily water the fracture is considered to be a problem and thus undesirable. By the method of this invention the undesirable fracture can be filled with fine cement to plug it and thereby terminate the flow of fluid therein.

The fine particle size cement of this invention can be placed in a subterranean fracture as well as in a high permeability zone of the formation by the application of conventional procedures. The cement itself, although it is highly reactive due to its small particle size, can be rendered temporarily non-reactive by preventing contact between it and water prior in time to actual placement of the cement into the fracture. Accordingly the fine cement of this invention is dispersed in a relatively low viscosity, relatively non-volatile liquid hydrocarbon, such as diesel oil, to form a pumpable slurry of cement in oil.

The dispersion of the cement in the non-volatile liquid hydrocarbon must be assisted by use of an appropriate surfactant, which is hereinafter more fully described. In this regard it has been discovered that a mixture of the fine cement of this invention with the liquid hydrocarbon, in the absence of a surfactant, produces a blend having a viscosity so high that the blend cannot be pumped by conventional means into the desired location in the formation. Use of the surfactant, as described below, results in a blend of cement in hydrocarbon having a sufficiently low viscosity to permit convenient conventional introduction of the blend into the desired location in the formation.

Furthermore, it has also been discovered that the high beneficial hydraulic activity of the fine particle size cement of this invention can be unduly reduced upon contact with a hydrocarbon, but that the problem can be avoided by use of the hereinafter further described surfactant.

Thus, the use of a surfactant is necessary to enable the production of a cement in hydrocarbon slurry having a sufficiently low viscosity to permit convenient placement in the desired zone, and to prevent the liquid hydrocarbon carrier from oil wetting the surface of the small particle size cement because such oil wetting would cause the fine cement to suffer a loss of hydraulic activity. The slurry is then introduced into the fracture.

After the slurry of cement and oil is in the fracture, water flowing in the fracture slowly contacts the cement to thereby render the cement reactive so as to initiate hydration, hardening and ultimate formation of a permanent plug in the fracture. By this technique the cement in the hydrocarbon/surfactant/cement slurry will only set when contacted by water in the fracture and thus will not set if the slurry enters a fracture containing oil. Accordingly, oil producing portions of a reservoir will remain relatively damage free.

As mentioned above, successful formulation of a cement in hydrocarbon oil slurry to obtain the goals set out above depends upon sufficient dispersion of the cement in the oil. In this regard, such a dispersion is obtained by combining a hydrocarbon liquid, such as diesel oil, a soluble hydrocarbon liquid surfactant, as hereinafter defined, and the fine particle size cement of this invention. The preferred order of blending of the ingredients involves adding the correct quantity of surfactant to the hydrocarbon liquid with thorough mixing and then slowly adding the cement to the oil/surfactant blend with continued mixing to obtain the desired slurry of uniform consistency.

The surfactant useful herein, which is a solution consisting of an aromatic sulfonic acid or a salt thereof dissolved in a low molecular weight alcohol, is mixed with a hydrocarbon liquid, such as diesel oil, in an amount in the range of from about 10 to about 25 and preferably about 20 gallons of surfactant solution per 1000 gallons of hydrocarbon liquid. The quantity of hydrocarbon liquid to be utilized is dependent upon the quantity of fine particle size cement employed and is in the range of from about 6 to about 10 gallons of hydrocarbon liquid per 100 pounds of fine cement. The amount of hydrocarbon liquid and surfactant utilized, within the scope of the above proportions, will determine the density of the resulting cement/hydrocarbon slurry wherein the slurry density is inversely proportional to the quantity of liquid. Accordingly, 4400 pounds of fine cement, 5.5 gallons of a preferred surfactant and 275 gallons of diesel will produce a slurry having a density of about 14.1 pounds per gallon while 4400 pounds of fine cement, 8.0 gallons of surfactant and 400 gallons of diesel will produce a slurry having a density of about 12.5 pounds per gallon.

The low viscosity, non-volatile hydrocarbon liquid useful herein can be an aliphatic compound, such as hexane, heptane or octane, an aromatic compound such as benzene, toluene or xylene and mixtures thereof such as kerosene, diesel oil, mineral oil and lubricating oil.

As mentioned previously, the surfactant includes, as an essential component, an aromatic sulfonic acid or a salt thereof. This component is sometimes referred to herein as the organic acid or salt component. The organic acid component is a compound identified by the formulas:

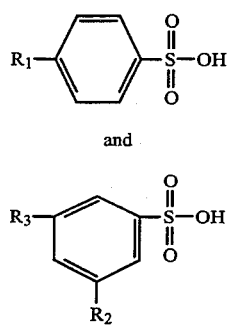

wherein $R_1$ is selected from linear alkyl groups having 12 carbon atoms or 16 to 24 carbon atoms and $R_2$ and $R_3$ are linear alkyl groups containing 12 carbon atoms.

Compounds within the scope of formulas (1) and (2) known to be useful herein are the acids themselves as well as the alkaline earth metal salts thereof. The preferred such salts are the calcium salts and the magnesium salts.

The preferred organic acid component of the surfactant of this invention is selected from the group consisting of calcium dodecylbenzene sulfonate, calcium didodecylbenzene sulfonate and calcium salts of benzenesulfonic acid having linear alkyl groups containing 16 to 24 carbon atoms. The most preferred is calcium dodecylbenzene sulfonate.

In a broader context the organic acid component is thought to include linear alkyl aromatic sulfonic acid, linear alkyl aromatic phosphonic acid, linear alkyl aromatic sulfonates and linear alkyl aromatic phosphonates having at least one linear alkyl group containing at least eight carbon atoms.

The low molecular weight alcohol solvent component of the surfactant solution is selected from aliphatic alcohols having in the range of from 1 to 5 carbon atoms wherein isopropanol is preferred.

The alcohol is present in the surfactant solution in the range of from about 20 to about 40 and preferably about 25 parts alcohol per 100 parts by volume of the surfactant solution.

The organic acid or salt component of the surfactant solution is present in the surfactant in the range of from about 60 to about 80 and preferably about 75 parts acid or salt per 100 parts by volume of the surfactant solution.

In view of the above, it is evident that Dahl, et al., teach that the surfactant solution is first blended with the hydrocarbon liquid with thorough mixing followed by slowly adding the cement to the oil/surfactant blend with continued mixing. Accordingly, Dahl, et al., limit their invention to the use of a cement-in-hydrocarbon slurry wherein the cement phase of the slurry does not harden unless the slurry contacts water. If the slurry does not contact water downhole, then the cement does not set and a waste disposal problem is presented as the slurry is recovered with formation fluids.

We have now discovered that the fine particle size cement disclosed by Dahl, et al., can first be placed in contact with the surfactant in required amounts and then stored in a dry state for an indefinite period of time without loss of hydraulic activity. The surfactant-treated cement, hereinafter called the "surfactant cement", can thereafter be mixed with a hydrocarbon liquid to shut off water to obtain the results disclosed by Dahl, et al. The surfactant cement also can be mixed directly with water to form a slurry of fine particle size cement in water to perform all of the various other functions disclosed in U.S. Pat. No. 5,238,064 with no substantial change of produced results. In short, merely by contacting the dry cement with the surfactant, instead of mixing dry cement in a previously prepared surfactant/hydrocarbon liquid blend, has effectively converted the cement employed from a single purpose to a multipurpose material.

SUMMARY OF THE INVENTION

By the present invention, dry, fine particle size particulate cement compositions are provided which can be directly dispersed in water or in a hydrocarbon liquid and methods of using the compositions. The dry particulate cement compositions of this invention are comprised of a particulate hydraulic cement having deposited on the cement particles a surfactant which enables the direct dispersal of the cement particles in a hydrocarbon liquid, but the surfactant will not interfere with the direct dispersal of the cement in water nor adversely affect the properties of the water slurry or the set cement.

The surfactant is selected from the group consisting of the alkali and alkaline earth metal salts of aromatic sulfonic acids. Particularly suitable surfactants are the alkali and alkaline earth metal salts of dodecylbenzene sulfonic acid.

The dry, fine particle size cement composition of this invention can be prepared by merely adding a specific quantity of the surfactant to a specific quantity of dry cement, such as a sack, without need of any blending to thereby form a unit quantity of surfactant cement; or the composition can be prepared in volume quantities by uniformly blending an appropriate quantity of surfactant with an appropriate quantity of cement. The surfactant cement thus prepared can then be stored in specific quantities, such as in sacks or in volume, such as in silos, for an indefinite period of time until used.

When performing a cementing operation, the surfactant cement of this invention can be added directly to water in the well known manner to form a slurry of cement in water or it can be added directly to a hydrocarbon liquid to form a slurry of cement in oil.

When the surfactant cement used has been made by uniformly blending the surfactant with the cement then any quantity of cement can be removed from the blended volume for slurry preparation. However, when the surfactant cement used has not been made by uniformly blending the surfactant with the cement, then an entire unit quantity of surfactant cement must be employed to obtain desired results.

The methods of forming a hydrocarbon liquid cement slurry are comprised of mixing a relatively low viscosity hydrocarbon liquid with the surfactant cement composition of this invention. The methods of terminating the flow of water from a permeable zone or fracture in a hydrocarbon producing subterranean formation comprise the steps of mixing a relatively low viscosity hydrocarbon liquid with the surfactant cement composition of this invention to thereby form a hydrocarbon liquid cement slurry, introducing the slurry into a permeable zone or fracture in a volume sufficient to form a cement plug therein and maintaining the slurry in the zone or fracture for a time sufficient for the cement in the slurry to be contacted with water in the zone or fracture and to form a water impermeable cement plug therein.

DESCRIPTION OF PREFERRED EMBODIMENTS

The dry, fine particle size hydraulic cement compositions of this invention are comprised of a fine particle size hydraulic cement having a surfactant deposited thereon to enable the direct dispersal of the cement in a hydrocarbon liquid. The deposited surfactant does not interfere with the direct dispersal of the cement in water.

Any of a variety of particulate hydraulic cements can be utilized in accordance with this invention. For example, Portland cement, high alumina cement, slag, ASTM Class F fly ash with lime, ASTM Class C fly ash, condensed silica fume with lime and gypsum cement (calcium sulfate hemihydrate) can be utilized. Of these, Portland cement, slag and mixtures of Portland cement and slag are preferred with Portland cement being the most preferred.

The particulate hydraulic cements utilized in accordance with this invention have particles of diameters no greater than about 30 microns. Small particle size Portland cement is disclosed in U.S. Pat. No. 4,160,674 issued on Jul. 10, 1979 to Sawyer. Methods of utilizing such small particle size Portland cement and other cementitious materials such as slag, and mixtures of slag and Portland cement in well cementing are described in Dahl, et al., mentioned above, in U.S. Pat. No. 5,121,795 entitled "Squeeze Cementing" issued on Jun. 16, 1992 and in U.S. Pat. No. 5,125,455 entitled "Primary Cementing" issued on Jun. 30, 1992.

The small particle size hydraulic cement used in accordance with this invention, preferably Portland cement, slag and mixtures of Portland cement and slag, are made up of particles having diameters no larger than about 30 microns, more preferably no larger than about 17 microns and still more preferably no larger than about 11 microns. The distribution of various sized particles within the cementitious materials is preferably such that 90% of the particles have a diameter no greater than about 25 microns, more preferably about 10 microns and still more preferably about 7 microns, 50% of the particles have a diameter no greater than about 10 microns, more preferably about 6 microns and still more preferably about 4 microns, and 20% of the particles have a diameter no greater than about 5 microns, more preferably about 3 microns and still more preferably about 2 microns. The Blaine Fineness of the particles is preferably no less than about 6000 square centimeters per gram. More preferably, the Blaine Fineness is no less than about 7000, still more preferably about 10,000 and most preferably no less than about 13,000 square centimeters per gram.

The surfactant useful in this invention is a salt of an aromatic sulfonic acid selected from the group consisting of aromatic sulfonates having the formula

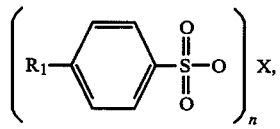

and aromatic sulfonates having the formula

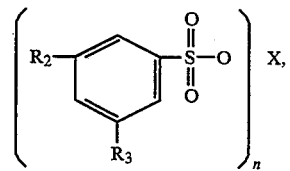

wherein $R_1$ is a linear alkyl group having 12 carbon atoms or a linear alkyl group having from 16 to 24 carbon atoms, $R_2$ and $R_3$ are linear alkyl groups having 12 carbon atoms, X is an alkali or alkaline earth metal and n is 1 or 2. Surfactants of the type described above preferred for use in accordance with this invention are those selected from the group consisting of the alkaline earth metal salts of dodecylbenzene sulfonic acid with calcium dodecylbenzene sulfonate being the most preferred.

The surfactant can be combined with the particulate hydraulic cement utilized in various ways. For example, the surfactant can be dissolved in a suitable solvent to thereby form a surfactant solution. The surfactant solution can then be directly injected into a specific quantity of fine particle size cement without any need to attempt to uniformly mix or blend the solution with the cement to thereby form a unit quantity of surfactant cement. By way of example, a specific quantity of surfactant solution in a hypodermic needle can be injected into a sack of fine particle size cement to thereby form a unit quantity of surfactant cement. The unit quantity of surfactant cement can be used immediately or it can be stored for an indeterminate period of time before use without loss of hydraulic activity. When the cement is mixed with a hydrocarbon liquid, the entire unit quantity must be used to assure that the correct amounts of cement and surfactant are mixed in the hydrocarbon medium.

The surfactant solution can also be sprayed on a volume of particulate hydraulic cement or otherwise uniformly blended with the particulate hydraulic cement followed by the removal of the alcohol solvent by evaporation. The removal of the solvent causes the aromatic sulfonic acid salt surfactant to be deposited on the cement particles.

The blended surfactant cement can be used immediately in any quantity or it can be stored for an indeterminate period of time before use without loss of hydraulic activity and then used in any quantity.

The solvent for the surfactant can be one or more low molecular weight alcohols such as aliphatic alcohols having in the range of from 1 to about 5 carbon atoms in an amount in the range of from about 60 to about 80 parts surfactant per 100 parts by volume of solution.

One particularly preferred surfactant solution consists of 66 percent by weight calcium dodecylbenzene sulfonate, 17 percent by weight n-butanol, 16 percent by weight petroleum solvent (CAS No. 64742-95-6) and 1 percent by weight naphthalene.

The particular amount of surfactant deposited on the cement particles is preferably an amount in the range of from about 0.2% to about 1% by weight of the resulting surfactant cement composition, most preferably an amount of about 0.5% by weight of the surfactant cement composition.

As mentioned above, the particulate cement compositions of this invention are directly dispersable in a hydrocarbon liquid. That is, the methods of forming a hydrocarbon liquid slurry using the particulate hydraulic cement of this invention basically comprise directly mixing the hydraulic cement composition of this invention with a relatively low viscosity hydrocarbon liquid in an amount in the range of from about 7 pounds to about 16 pounds of cement composition per gallon of hydrocarbon liquid.

A variety of relatively low viscosity hydrocarbon liquids can be utilized. For example, the hydrocarbon liquid can be an aliphatic compound such as hexane, heptane or octane, an aromatic compound such as benzene, toluene or xylene and mixtures of such compounds such as kerosene, diesel oil, mineral oil and lubricating oil. Generally a hydrocarbon liquid selected from the group consisting of kerosene, diesel oil, mineral oil and lubricating oil is preferred with diesel oil being the most preferred.

As mentioned above, subterranean formations often include permeable zones or streaks, natural fractures and/or fractures produced by forces applied deliberately or accidentally during production operations. It is known that such zones and fractures provide paths of least resistance to the flow of fluids from a formation to a well bore. When the fluid flowing is primarily a hydrocarbon fluid, the zone or fracture is considered to be beneficial and thus desirable. However, when the fluid flowing in the zone or fracture from the formation to the well bore is primarily water, the zone or fracture is considered to be a problem and thus undesirable.

In accordance with the methods of this invention, the undesirable flow of water from a permeable zone or fracture in a hydrocarbon producing subterranean formation is terminated. That is, a hydrocarbon liquid cement slurry is first produced by directly mixing a relatively low viscosity hydrocarbon liquid of the type described above with the dry, fine particle size hydraulic cement composition of this invention. The resulting hydrocarbon liquid cement slurry is introduced into the permeable zone or fracture in the subterranean formation by way of the well bore in a volume sufficient to form a cement plug therein when the cement in the slurry is contacted by water. The slurry is maintained in the zone or fracture for a time whereby the cement in the slurry is contacted by water in the zone or fracture and a water impermeable cement plug is formed therein. The cement in any portion of the slurry which is not contacted by water in the zone or fracture will not set and will be produced back from the subterranean formation. Accordingly, hydrocarbon producing portions of the formation remain relatively damage free.

The following examples are given to further illustrate the cement compositions and methods of this invention.

EXAMPLE 1

Various aqueous cement slurries were prepared using a small particle size Portland cement composition of this invention, i.e., the cement particles had a dispersing agent of the type described herein deposited thereon. Other aqueous cement slurries were prepared using ordinary small particle size Portland cement. The cement compositions were tested for compressive strengths at various temperatures and for fluid loss control properties in accordance with the test procedures described in *API Specification for Materials and Testing for Well Cements*, API Specification 10A, 21st Edition dated Sep. 1, 1991 of the American Petroleum Institute, Washington, D.C. The descriptions of the cement compositions and the test results are set forth in Tables I through III below. The fluid loss control test results are set forth in Table IV below.

TABLE I

24 Hour Compressive Strength Development at 160° F. and 180° F.

| Cement Slurry Tested | | | | |
|---|---|---|---|---|
| Cement | Set Retarder[3], gal per 50 lb. sack of cement | Water, % by weight of cement | Compressive Strength, psi | |
| | | | 160° F. | 180° F. |
| Portland[1] | 0.046 | 154 | 470 | 500 |
| Cement Composition of this invention[2] | 0.046 | 154 | 370 | 450 |
| Portland[1] | — | 154 | 640 | 550 |
| Cement Composition of this invention[2] | — | 154 | 400 | 440 |

[1]Small particle size Portland cement having particle diameters no larger than about 30 microns.
[2]Small particle size Portland cement having particle diameters no larger than about 30 microns and having calcium dodecylbenzene sulfonate deposited thereon.
[3]Set retarder comprised of aminotri(methylene phosphonic acid).

TABLE II

Compressive Strength Development at 40° F.

| Cement Slurry Tested | | | | |
|---|---|---|---|---|
| Cement | Water, % by weight of cement | Compressive Strength, psi | | |
| | | 24 hour | 72 hour | 7 day |
| Portland[1] | 141 | 40 | 560 | 760 |
| Cement Composition of this invention[2] | 141 | 30 | 240 | 330 |

[1]Small particle size Portland cement having particle diameters no larger than about 30 microns.
[2]Small particle size Portland cement having particle diameters no larger than about 30 microns and having calcium dodecylbenzene sulfonate deposited thereon.

TABLE III

Compressive Strength Development at 80° F.

| Cement Slurry Tested | | | | |
|---|---|---|---|---|
| Cement | Water, % by weight of cement | Compressive Strength, psi | | |
| | | 24 hour | 72 hour | 7 day |
| Portland[1] | 176 | 240 | 310 | 390 |
| Cement Composition of this invention[2] | 176 | 160 | 190 | 250 |

[1]Small particle size Portland cement having particle diameters no larger than about 30 microns.
[2]Small particle size Portland cement having particle diameters no larger than about 30 microns and having calcium dodecylbenzene sulfonate deposited thereon.

TABLE IV

Fluid Loss Control at 190° F.

| Cement Slurry Tested | | | | |
|---|---|---|---|---|
| Cement | Set Retarder[3], gal per 50 lb sack of cement | Fluid Loss Additive, % by weight of cement | Water, % by weight of cement | 190° F. Fluid Loss, cc/30 min. |
| Portland[1] | 0.174 | 2[4] | 100 | 300 |
| Cement Composition of this invention[2] | 0.174 | 2[4] | 100 | 31 |

TABLE IV-continued

| | Fluid Loss Control at 190° F. | | | |
|---|---|---|---|---|
| | Cement Slurry Tested | | | |
| Cement | Set Retarder[3], gal per 50 lb sack of cement | Fluid Loss Additive, % by weight of cement | Water, % by weight of cement | 190° F. Fluid Loss, cc/30 min. |
| Portland[1] | 0.174 | 2[5] | 100 | 80 |
| Cement Composition of this invention[2] | 0.174 | 2[5] | 100 | 74 |

[1]Small particle size Portland cement having particle diameters no larger than about 30 microns.
[2]Small particle size Portland cement having particle diameters no larger than about 30 microns and having calcium dodecylbenzene sulfonate deposited thereon.
[3]Set retarder comprised of aminotri(methylene phosphonic acid).
[4]Fluid loss additive is a copolymer of AMPS ® and N,N-dimethylacrylamide(See U.S. Pat. No. 4,555,269).
[5]Fluid loss additive is a graft lignin or lignite polymer (See U.S. Pat. No. 4,676,317).

From Tables I–IV, it can be seen that the cement compositions of this invention produce good compressive strengths and have good fluid loss control properties comparable to Portland cement. It can also be seen from Tables I–III that the set time of the cement of this invention is retarded with respect to cement not treated with the surfactant.

EXAMPLE 2

A cement composition of this invention is prepared by spraying 3 gallons of a 50% by weight solution of calcium dodecylbenzene sulfonate in a mixed hydrocarbon solvent on 2500 pounds of small particle size Portland cement and evaporating the solvent. The solvent was comprised of 48.1% by weight isopropanol, 25% by weight butanol, 24% by weight of petroleum solvent (CAS No. 64742-95-6) and 2.5% by weight naphthalene. 50 grams of the resulting cement composition were mixed with 25 grams of kerosene, and the resulting kerosene-cement slurry was mixed with 2.5 grams of water. The slurry formed a stiff gel 15 minutes after the water was added.

A kerosene-cement slurry was made according to the procedure of Dahl, et al., by adding 0.17 grams of a 50% by weight isopropanol solution of calcium dodecylbenzene sulfonate to 25 grams of kerosene and followed by mixing 50 grams of fine particle size Portland cement therewith. After addition of 2.5 grams of water to the kerosene-cement slurry, a stiff gel was formed in 30 minutes.

EXAMPLE 3

Surfactant cement was prepared by uniformly blending 2,500 pounds of fine particle size Portland cement commercially available from Halliburton Company under the trademark MICRO MATRIX with two gallons of surfactant solution commercially available from WITCO Chemical Company under the trademark Witconate 605A.

The surfactant solution, on a weight percent basis, consisted of:

| | |
|---|---|
| Calcium dodecylbenzene sulfonate | 66% |
| n-butanol | 17% |
| petroleum solvent (CAS. No. 64742-95-6) | 16% |
| naphthalene | 1% |

After the solvent evaporated, to yield a dry, fine particle size Portland cement, the treated cement—referred to as Surfactant Cement—was compared to untreated cement—referred to as Micro Matrix Cement—on the basis of thickening time, compressive strength, and fluid loss. The tests were based on water slurries of the cement as more fully set out Tables V—VII below.

TABLE V

| | Thickening Time[1] Tests at 140° F. | | | | | | | |
|---|---|---|---|---|---|---|---|---|
| Run # | Surfactant Cement grams | Micro Matrix Cement grams | Retarder[2] grams | Dispersent[3] grams | Fluid Loss[4] Additive grams | Water grams | Density of Slurry lb/gal | Thickening Time hrs:min |
| 1 | 400 | 0 | 5.76 | 4.0 | 4.0 | 400 | 12.5 | 6:30 |
| 2 | 0 | 400 | 5.76 | 4.0 | 4.0 | 400 | 12.5 | 4:15 |
| 3 | 300 | 0 | 2.59 | 0 | 0 | 462 | 11.3 | 2:50 |
| 4 | 0 | 300 | 2.59 | 0 | 0 | 462 | 11.3 | 2:45 |

TABLE VI

| | Compressive Strength[5] Development 7 Days | | | | | | | |
|---|---|---|---|---|---|---|---|---|
| Run # | Surfactant Cement grams | Micro Matrix Cement grams | Micro Sand[8] grams | Retarder[7] grams | Dispersant[3] Additive grams | Water grams | Slurry Density lb/gal | Compressive Strength psi |
| 5 | 0 | 300 | 180 | 3.0 | 3.0 | 453 | 12.5 | 3350[8] |
| 6 | 300 | 0 | 180 | 3.0 | 3.0 | 453 | 12.5 | 3110[8] |
| 7 | 0 | 300 | 0 | 0 | 0 | 423 | 11.5 | 710[9] |
| 8 | 300 | 0 | 0 | 0 | 0 | 423 | 11.5 | 450[9] |

TABLE VII

| | | | Fluid Loss Control Tests at 190° F. | | | | |
|---|---|---|---|---|---|---|---|
| Run # | Surfactant Cement grams | Micro Matrix Cement grams | Retarder[2] grams | Fluid Loss[4] grams | Water grams | Slurry Density lb/gal | Fluid Loss cc/30 min |
| 9 | 0 | 400 | 13.32 | 8.0 | 400 | 12.5 | 42 |
| 10 | 400 | 0 | 13.32 | 8.0 | 400 | 12.5 | 34 |

Notes for Table V through VII
[1] API SPEC 10, Section 8, July 1, 1986
[2] MMCR Retarder is designed for use with fine particle size cement and is commercially available from Halliburton Company
[3] CFR-3, commercially available from Halliburton Company, U.S. Pat. No. 4,585,853
[4] Halad-344, commercially available from Halliburton Company, U.S. Pat. No. 4,555,269
[5] Section 7, API Spec 10, July 1, 1986
[6] Silica Sand, 8–11 micron
[7] HR-12, commercially available from Halliburton Company
[8] 320° F. test temperature
[9] 40° F. test temperature

What is claimed is:

1. A dry, fine particle size particulate hydraulic cement composition which is directly dispersable in water and in a hydrocarbon liquid comprising:
   a fine particle size particulate hydraulic cement having deposited thereon a surfactant selected from the group consisting of:
   an aromatic sulfonate having the formula

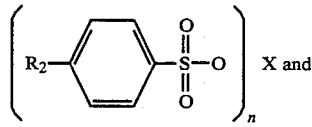

an aromatic sulfonate having the formula

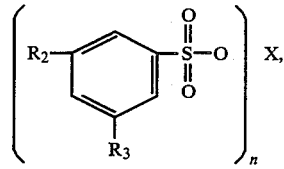

wherein $R_1$ is a linear alkyl group having 12 carbon atoms or a linear alkyl group having from 16 to 24 carbon atoms, $R_2$ and $R_3$ are linear alkyl groups having 12 carbon atoms, X is an alkali or alkaline earth metal and n is 1 or 2,
   and further wherein the particles of said hydraulic cement have diameters no larger than about 30 microns and a Blaine Fineness no less than about 6000 square centimeters per gram.
   and still further wherein said surfactant is deposited on said hydraulic cement in an amount in the range of from about 0.2% to about 1% by weight of said cement composition.

2. The cement composition of claim 1 wherein said surfactant is selected from the group consisting of the alkaline earth metal salts of dodecylbenzene sulfonic acid.

3. The cement composition of claim 1 wherein said hydraulic cement is selected from the group consisting of Portland cement, slag or mixtures thereof.

4. The cement composition of claim 1 wherein said hydraulic cement is Portland cement and said surfactant is calcium dodecylbenzene sulfonate.

5. A method of forming a hydrocarbon liquid cement slurry comprising mixing a relatively low viscosity hydrocarbon liquid with a dry, fine particle size particulate hydraulic cement composition, said cement composition being comprised of a fine particle size particulate hydraulic cement having deposited thereon a surfactant wherein said surfactant is selected from the group consisting of:
   an aromatic sulfonate having the formula

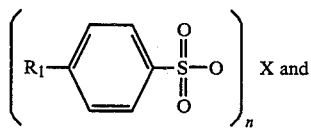

an aromatic sulfonate having the formula

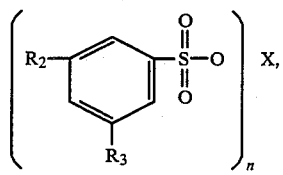

wherein $R_1$ is a linear alkyl group having 12 carbon atoms or a linear alkyl group having from 16 to 24 carbon atoms, $R_2$ and $R_3$ are linear alkyl groups having 12 carbon atoms, X is an alkali or alkaline earth metal and n is 1 or 2,
   said relatively low viscosity hydrocarbon liquid is selected from the group consisting of kerosene, diesel oil, mineral oil and lubricating oil,
   wherein the particles of said hydraulic cement have diameters no larger than about 30 microns and a Blaine Fineness no less than about 6000 square centimeters per gram.

6. The method of claim 5 wherein said surfactant is selected from the group consisting of the alkaline earth metal salts of dodecylbenzene sulfonic acid.

7. The method of claim 5 wherein said hydraulic cement is selected from the group consisting of Portland cement, slag or mixtures thereof.

8. The method of claim 5 wherein said hydraulic cement is Portland cement and said surfactant is calcium dodecylbenzene sulfonate.

9. The method of claim 8 wherein said hydraulic cement is present in said slurry in an amount in the range of from about 7 pounds to about 16 pounds per gallon of hydrocarbon liquid therein.

10. A method of terminating the flow of water from a permeable zone or fracture in a hydrocarbon producing subterranean formation penetrated by a well bore comprising the steps of:
    (a) forming a cement slurry by mixing a relatively low viscosity hydrocarbon liquid with a dry, fine particle size hydraulic cement composition comprised of a fine particle size hydraulic cement having deposited thereon a surfactant;

(b) introducing said cement slurry into said permeable zone or fracture by way of said well bore in a volume sufficient to form a cement plug therein when the cement in said slurry is contacted by water; and (c) maintaining said slurry in said zone or fracture for a time whereby said cement in said slurry is contacted by water in said zone or fracture and a water impermeable cement plug is formed therein, wherein said surfactant is selected from the group consisting of:

an aromatic sulfonate having the formula

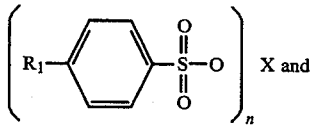

an aromatic sulfonate having the formula

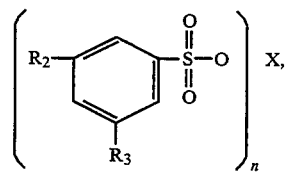

wherein $R_1$ is a linear alkyl group having 12 carbon atoms or a linear alkyl group having from 16 to 24 carbon atoms, $R_2$ and $R_3$ are linear alkyl groups having 12 carbon atoms, X is an alkali or alkaline earth metal and n is 1 or 2.

11. The method of claim 10 wherein said relatively low viscosity hydrocarbon liquid is selected from the group consisting of kerosene, diesel oil, mineral oil and lubricating oil.

12. The method of claim 10 wherein said surfactant is selected from the group consisting of the alkaline earth metal salts of dodecylbenzene sulfonic acid.

13. The method of claim 10 wherein said hydraulic cement is selected from the group consisting of Portland cement, slag or mixtures thereof.

14. The method of claim 13 wherein the particles of said hydraulic cement have diameters no larger than about 30 microns and a Blaine Fineness no less than about 6000 square centimeters per gram.

15. The method of claim 10 wherein said hydraulic cement is Portland cement having a particle size no greater than about 30 microns and a Blaine Fineness no less than about 6000 square centimeters per gram, and said dispersing agent deposited thereon is calcium dodecylbenzene sulfonate.

16. The method of claim 15 wherein said hydraulic cement is present in said slurry in an amount in the range of from about 7 pounds to about 16 pounds per gallon of hydrocarbon liquid.

* * * * *